No. 864,642. PATENTED AUG. 27, 1907.
J. C. HAMES.
APPARATUS FOR TREATING ORES.
APPLICATION FILED APR. 8, 1907.

2 SHEETS—SHEET 1.

No. 864,642. PATENTED AUG. 27, 1907.
J. C. HAMES.
APPARATUS FOR TREATING ORES.
APPLICATION FILED APR. 8, 1907.

2 SHEETS—SHEET 2.

Witnesses
Oliver W. Holmes
J. J. Sheehy Jr.

Inventor
J. C. Hames.
By James Sheehy
Attorney

UNITED STATES PATENT OFFICE.

JOSEPH C. HAMES, OF GOLDFIELD, NEVADA.

APPARATUS FOR TREATING ORES.

No. 864,642.　　　Specification of Letters Patent.　　　Patented Aug. 27, 1907.

Application filed April 8, 1907. Serial No. 367,022.

*To all whom it may concern:*

Be it known that I, JOSEPH C. HAMES, a citizen of the United States, residing at Goldfield, in the county of Esmeralda and State of Nevada, have invented new and useful Improvements in Apparatus for Treating Ores, of which the following is a specification.

My invention pertains to apparatus for treating ores with a view of recovering values therefrom; and it consists in the peculiar and advantageous apparatus hereinafter described and particularly pointed out in the claims appended.

Figure 1:
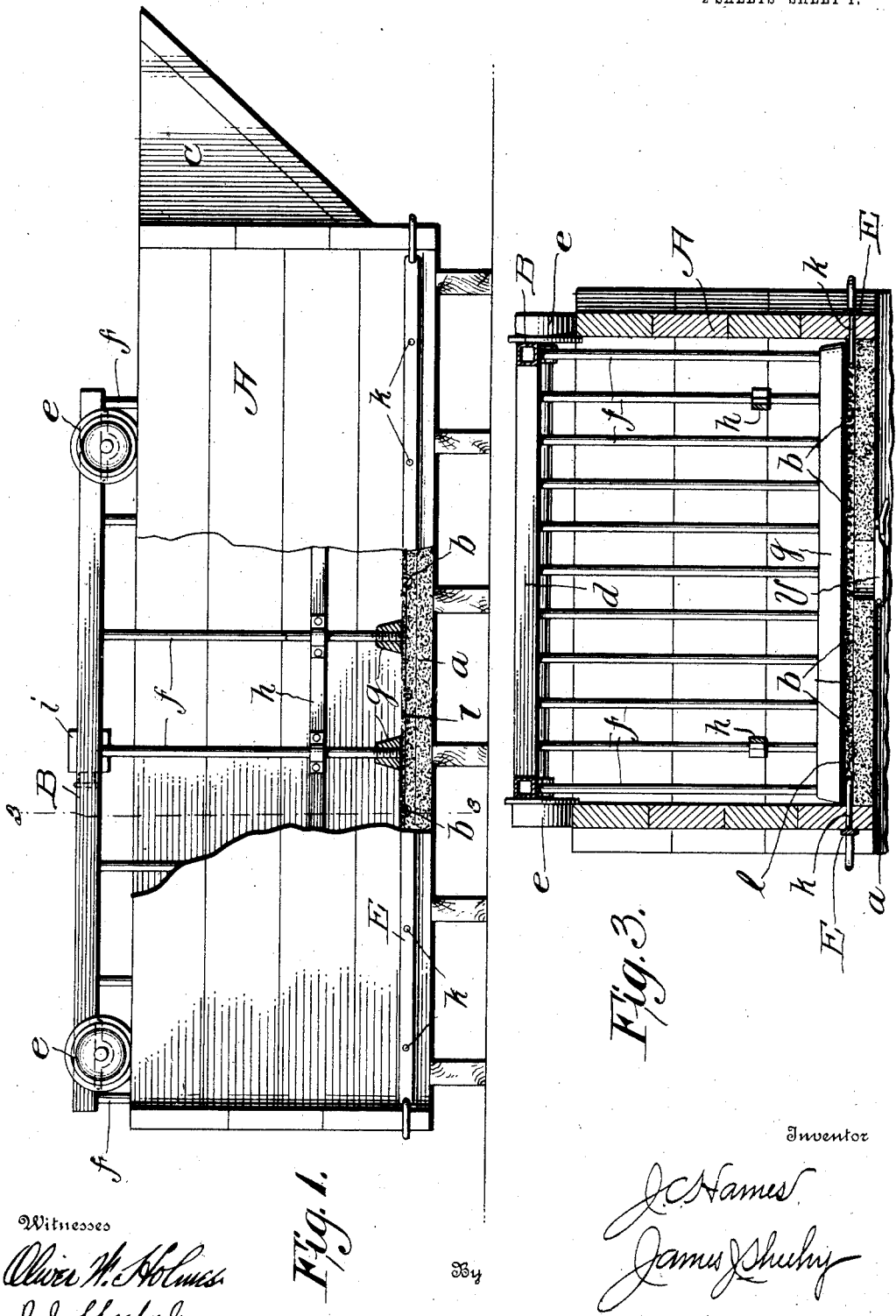
Figure 2:
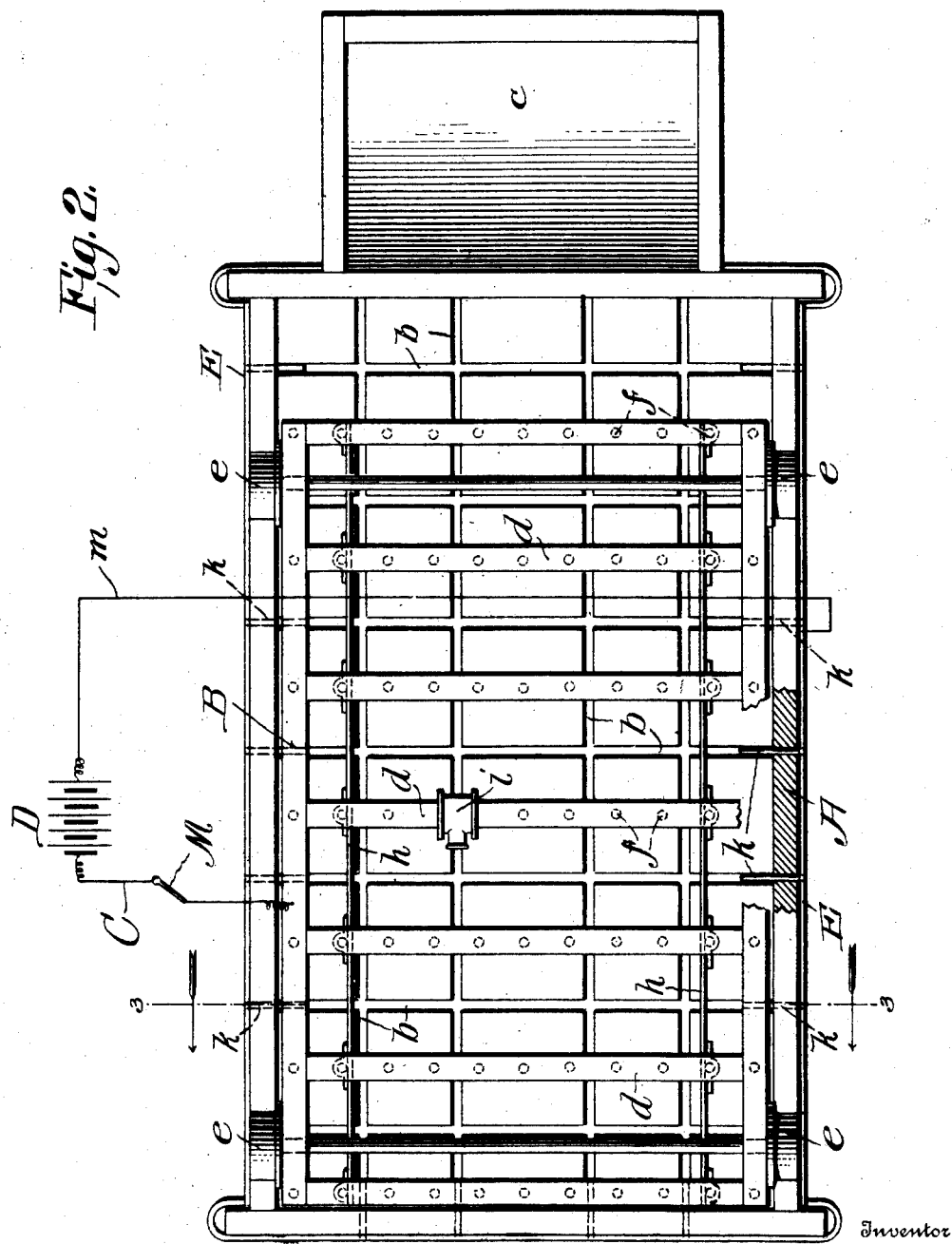

In the accompanying drawings, forming part of this specification: Figure 1 is a view, partly in side elevation and partly in section, showing the apparatus constituting the preferred embodiment of my invention. Fig. 2 is a plan view of the same, partly in section, with the mercury omitted. Fig. 3 is a transverse section taken in the plane indicated by the line 3—3 of Fig. 1, looking rearward.

Similar letters designate corresponding parts in all of the views of the drawings, referring to which:

A is a tank in which ore and a treatment solution are initially brought in contact with each other. The said tank A is provided with a bottom wall $a$, of stone, cement or analogous material, in which are longitudinal and crosswise intersecting grooves $b$; and it is also provided with a hopper $c$ for conveying ore into the solution below the surface of the latter and so as to assure all dust and fine particles of ore being deposited in the solution.

Arranged in the tank A is a reciprocatory agitator which may be moved to and fro in the direction of the length of the tank by hand or by any suitable power mechanism in the discretion of the party using the apparatus. The said agitator, Figs. 1 and 2, comprises a frame B having hollow side, end and intermediate cross-bars $d$, traveling wheels $e$ carried by said frame and arranged on the upper edges of the side walls of the tank A, pipes $f$ communicating with the said frame bars $d$ and extending downward therefrom to points adjacent to the bottom of the tank, plows or mullers $g$ one of which is carried by each transverse series of pipes $f$ and is arranged at the lower ends of said pipes; said plows or mullers being made of stone or analogous material, and tie-rods $h$ connecting the outer side pipes $f$ in longitudinal series and designed to lend rigidity and strength thereto. The agitator also comprises a coupling $i$ communicating with one of the hollow bars $d$ and designed to be connected with a source of water supply or treatment-solution supply. At this point I desire to say that the agitator with the exception of the plows or mullers $g$ is formed of metal, and it is electrically connected through a wire C, Fig. 2, or other suitable conductor with one pole of a source of electric energy D for an important purpose presently set forth. The pipes $f$ extend through the plows or mullers $g$ as shown in Fig. 1 in order to better lead both the water or solution and the electric current to the bottom of tank A.

Surrounding the lower portion of the tank A is a conductor E, preferably a strip of metal as shown, and this conductor is electrically connected by conductive branches $k$ with the mercury $l$ in the grooves $b$ of the tank bottom $a$, Fig. 3, and is also connected through a wire $m$ or other suitable conductor with the opposite pole of the source of electric energy D, with reference to the conductor C.

My novel apparatus is designed for the treatment of all gold and silver ores susceptible of being treated by liquid processes or by amalgamation, and the apparatus is preferably operated as follows, viz: sufficient mercury $l$ to fill all of the grooves $b$ in the bottom $a$ of tank A and to entirely cover said bottom $a$ is placed in the said tank, and a suitable treatment solution, preferably a solution of sodium or potassium cyanid together with a small amount of camphor, is run into the tank, the camphor having for its office to brighten the gold and mercury and to accelerate both amalgamation and reduction (as well as to drive off certain of the oxids that interfere with the gold and mercury coming together.) The agitator is then put in motion, a proper quantity of crushed ore is supplied to the tank, and the agitation of the commingled solution and ore is continued for about thirty minutes. This agitation causes the heavy or rich particles of ore to gravitate to the bottom of the tank where the mercury, which is kept bright by the motion of the ore and solution under the action of the plows or mullers $g$, can take hold of it. The electric switch M in conductor C is then closed to supply current to the agitator, and the agitation of the commingled solution and ore is continued for about five hours when thoroughly oxidized ores are being treated or about seven hours when the ores under treatment are but partially oxidized. The electric current from one pole, preferably the positive pole as shown, of the source of electric energy through the agitator and the solution to the mercury $l$ at the bottom of the tank A and from the mercury to the minus pole of the source of energy relieves the solution of the major portion of the metal it would otherwise absorb and deposits the metal in the mercury with the result that the dissolving strength of the solution is materially prolonged. At the termination of the period of five hours for thoroughly oxidized ores or seven hours for partially oxidized ores, practically all of the coarse gold—that is to say, approximately 90% thereof is amalgamated, and the fine gold that ordinarily remains in suspension in water and leaf or flake gold that tends to float is dissolved in the cyanid solution.

The tank A is preferably, though not necessarily, provided with a tailings or sand gate V, Fig. 3, and by opening this gate subsequent to the operation described the solution and pulp in the tank may be transferred therefrom to another receptacle to be filtered or otherwise treated.

By virtue of the construction of my apparatus, it will be apparent that the water or solution is discharged into the bottom of the tank A at many points throughout the area thereof which contributes materially to the opening and agitation of the mass of material, and that the electricity is led into the mercury at many points to promote the result before stated. It will also be apparent that the rectilinear movements of the plows or mullers $g$ in opposite directions contribute materially to the agitation of the mass of material and assure movement of the ore over the mercury so as to keep the latter bright and adapt it to take hold of the heavy and rich particles of ore, and that the abrasive action between the stone or analogous bottom of tank A and the stone or analogous plows or mullers $g$ and the ore materially assists the mercury in taking hold of the rich particles of ore.

The construction herein shown and described constitutes the preferred embodiment of my invention, but it is obvious that in practice various changes in the form, construction and relative arrangement of parts may be made without involving departure from the scope of my invention as defined in the claims appended. For instance while I prefer to make the bottom of the tank and the mullers of stone or similar material, I do not desire to be understood as confining myself to the use of such material, since in some cases both the tank bottom and the mullers may be made of wood in which event quartz or analogous material will be used on the bottom of the tank with a view of securing an abrasive action on the mercury and pulp.

Having described my invention, what I claim and desire to secure by Letters-Patent, is:

1. In an apparatus for the treatment of ores, the combination of a tank having a bottom of stone, and an agitator arranged in said tank crosswise of the same and comprising a plow or muller of stone movable rectilinearly in the direction of its width to and fro over the said bottom of the tank, and a plurality of pipes movable with and extending down through the plow or muller at intervals in the length thereof to the underside of said plow or muller and adapted to be connected with a source of liquid supply.

2. In an apparatus for the treatment of ores, the combination of a tank, and an agitator arranged in said tank and comprising wheels movable to and fro on opposite walls of the tank, a frame mounted on the wheels and having hollow cross-bars adapted to be connected with a source of liquid supply, plows or mullers movable in the direction of their width over the bottom of the tank, and a plurality of pipes connecting each of the hollow cross-bars of the frame and a plow or muller and extending down through the latter to the underside thereof.

3. In an apparatus for the treatment of ores, the combination of a tank, a plow or muller movable over the bottom of the tank to and fro in the direction of the length of the tank, a frame similarly movable on the tank and having a hollow portion adapted to be connected with a source of liquid supply, and a plurality of pipes connecting said hollow portion of the frame and the plow or muller and extending downward through the latter and having discharges at the underside thereof.

4. In an apparatus for the treatment of ores, the combination of a tank having a bottom of stone and arranged to hold mercury on said bottom, a source of electric energy, a conductor connected with one pole of said source of energy and provided with means for making electric connection with the said mercury, an agitator movable in the tank and comprising a stone plow or muller, a frame movable on the tank and having a hollow portion of conductive material and also having a conductive conduit between said hollow portion and the plow or muller and extending to the underside of the latter; the said hollow portion of the frame being adapted to be connected with a source of liquid supply, and an electric connection between the hollow portion of the frame and the opposite pole of the source of electric energy.

5. In an apparatus for the treatment of ores, the combination of a tank having a bottom of stone and arranged to hold mercury on said bottom, a source of electric energy, a conductor connected with one pole of said source of energy and having means for making electric connection with the said mercury, a stone plow or muller movable over the bottom of the tank, a conductive conduit connected with the said plow or muller and adapted to be connected with the opposite pole of the source of electric energy and also adapted to be connected with a source of liquid supply.

6. In an apparatus for the treatment of ores, the combination of a tank having a stone bottom and also having a hopper which communicates with its interior adjacent to the said bottom; the said tank being arranged to hold mercury on its bottom, a source of electric energy, a conductor connected with one pole of said source of energy and provided with means for making electric connection with the said mercury, an agitator arranged in said tank and comprising wheels movable to and fro on opposite walls of the tank, a frame of conductive material mounted on the wheels and having hollow cross-bars adapted to be connected with a source of liquid supply, stone plows or mullers arranged crosswise of the tank and movable in the direction of their width over the bottom of the tank, and a plurality of pipes connecting each of the hollow cross-bars of the frame and a plow or muller and extending down through the latter to the underside thereof, and a conductor intermediate the frame of the agitator and the opposite pole of the source of electric energy.

In testimony whereof I have hereunto set my hand in presence of two subscribing witnesses.

JOSEPH C. HAMES.

Witnesses:
J. D. MACMASTER,
ANDY ADAMS.